United States Patent Office 2,755,618
Patented July 24, 1956

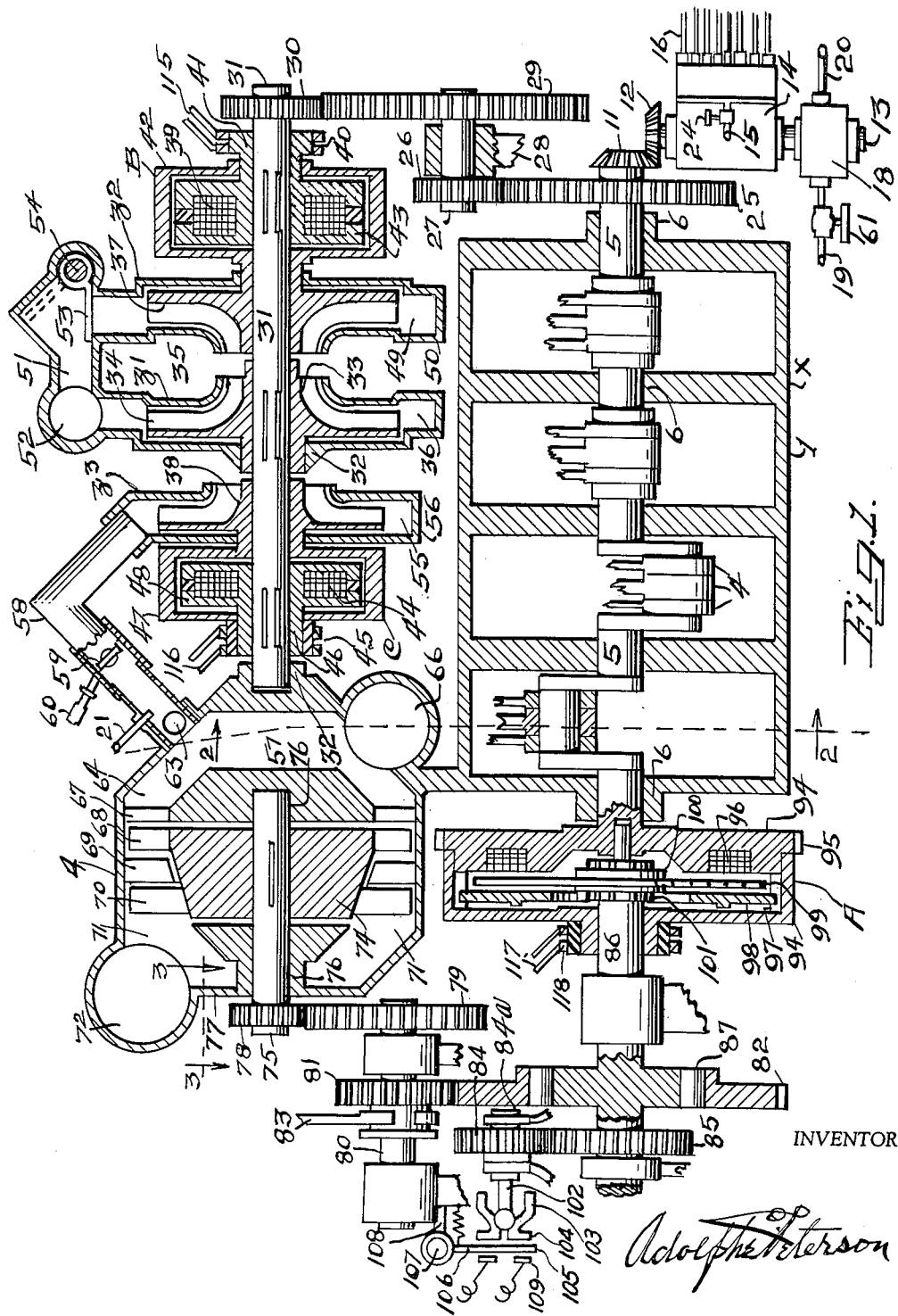

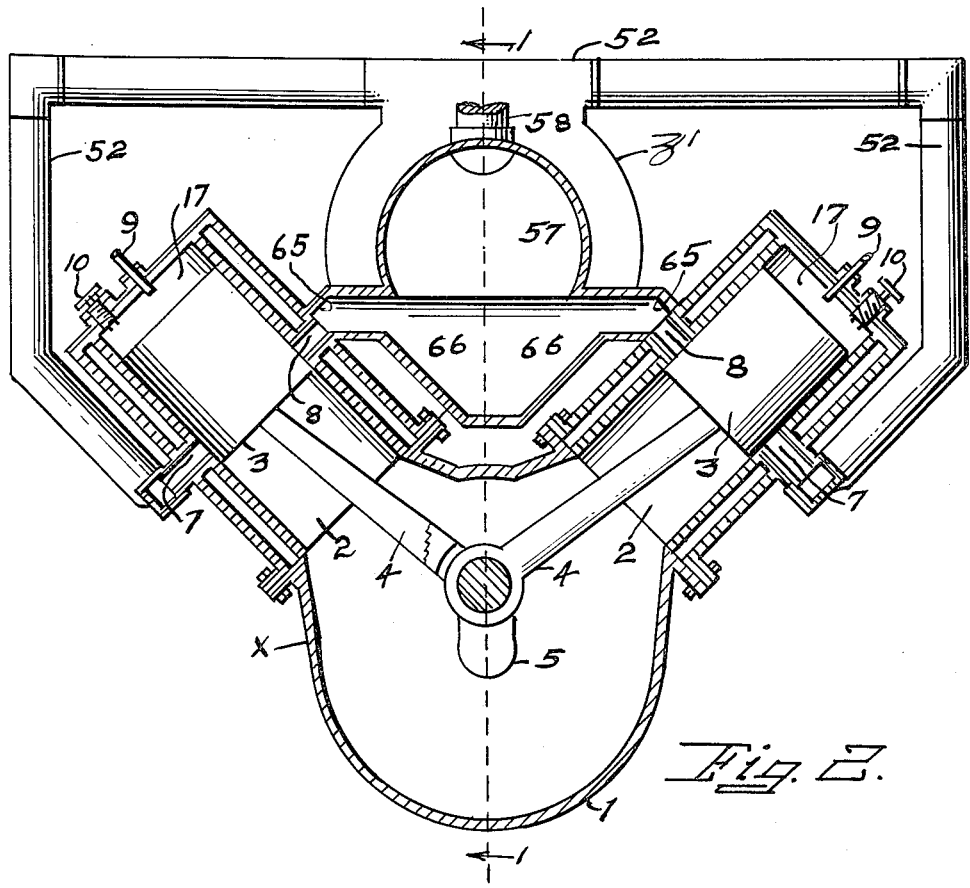

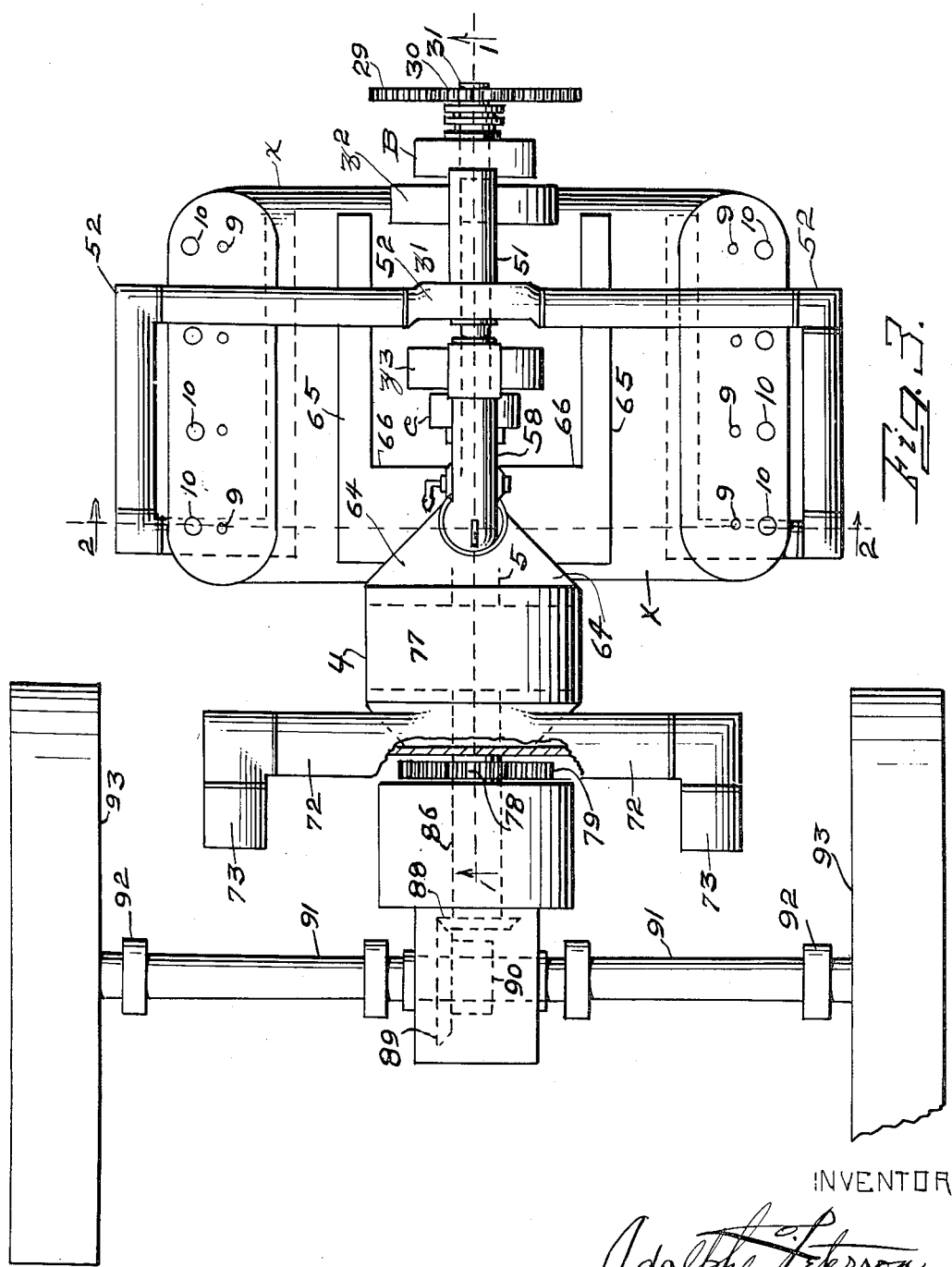

2,755,618

INTERNAL COMBUSTION ENGINE AND GAS TURBINE DRIVING MEANS

Adolphe C. Peterson, Minneapolis, Minn.

Application April 16, 1952, Serial No. 282,656

17 Claims. (Cl. 60—13)

My invention relates to automotive power and driving means especially adapted for wide variable torque in driving, and it is therefore called internal combustion engine and gas turbine driving means.

The principal objects of my invention are to provide a form of engine means and drive from the engine means, which will utilize not only the reciprocating piston engine for providing power with economy, but which will also utilize the gas turbine with its unusual characteristic of flexibity in drive with large relative torque application at any speed from low to high speeds. A chief object is to provide a means whereby the piston type internal combustion engine may be used for a direct drive to a driven shaft or means such as automobile wheels and whereby the same piston type engine may be used alternatively as a gas generating means to provide a high pressured stream of gas for use in driving a gas turbine to provide driving from this gas turbine to the driven element or automobile wheels. An object is also to provide in connection with the piston type engine and auxiliary gas turbine, a means for providing an increased flow of air for combustion in the cylinders of the piston type engine, for use during the periods of use of the gas turbine for provision of high torque for starting conditions and heavy pulling conditions, and also to provide such provision for increased flow of air for combustion to provide large additional torque for the driven shaft as auxiliary to the torque of the piston type engine used with the gas turbine means. An object is to provide such a means in combination, and in connection with this combination, automatic controlling means which will automatically effect either of the types of torque provision or driving to the driven element or automobile wheels. An object is to provide such means in connection with means automatically effecting the various types of charging of the engine cylinders and gas turbine, for different conditions. And in general the object is to provide such a means having such unusual characteristics of torque and economy for the propulsion of such vehicles, as passenger automobiles, passenger busses for public use, freight hauling trucks, railroad locomotives or cars, tractors, or other vehicles using engine means for propulsion.

The principal devices and combinations of devices comprising my invention are as hereinafter described and as defined in the claims. In the accompanying drawings, which illustrate my invention in its application to the driving of automobiles, like characters refer to like parts throughout the several views. Referring to the drawings:

Figure 1 is a view chiefly in vertical section on a plane passing through the axes of the engine crank shaft, the turbine rotor, and the compressor rotor axes of my device, some parts being shown in full side elevation, and some parts broken away, the section being a section on the lines 1—1 of Figures 2 and 3.

Figure 2 is a view in vertical section at right angles to the section of Figure 1, this section being on lines 2—2 of Figures 1 and 3, some parts being broken away, some parts being shown in the background, these parts being to the right of the section line 2—2 in Figure 1.

Figure 3 is a view which is chiefly a plan view of the device shown in Figures 1 and 2, to show chiefly the connecting conduit means in the plan view, some of such conduits being shown in dotted lines as under the solid line parts, there being a very small part in section through the turbine exhaust chamber on the line 3—3 of Figure 1, some parts being broken away, notably a part of the exhaust chamber of the turbine to show gears thereunder in clear view. This Figure 3 is on a considerably reduced scale over Figures 1 and 2, and shows in addition to the matter shown in Figures 1 and 2, the general application and connection of the device to automobile road wheels for driving thereof, only the road wheels of a chassis being shown, without suspension means or frame of the chassis to be suspended thereon.

Figure 4 is a diagrammatic view of the current control means and circuits through the electro-magnetic coils for the control of automatic clutching means of devices.

There are certain main units in the device which will first be generally designated as follows: X denotes a reciprocating piston internal combustion engine which is preferably of the two cycle type and is shown as an eight cylinder V-type unit; Y denotes a gas turbine unit which is generally a turbine rotor with its blades and is mounted in a turbine casing; Z1 is a centrifugal type main air blower or compressor; Z2 is a centrifugal type auxiliary air blower or compressor for the engine X; Z3 is a centrifugal type auxiliary air blower or compressor for the gas turbine Y. It will be understood that the centrifugal type compressors designated are of such capacity that each may deliver air from atmosphere under relatively high pressure under the conditions requiring the high pressure, which pressure may be as high as fifty to seventy five pounds per square inch or even more, but it should also be noted that the compressor Z3 is by its proportioning (of somewhat lesser diameter) adapted to deliver air under a pressure just slightly less than the pressure of air from the other compressors Z1 and Z2, so that gas flow will not be interfered with, as hereafter described. Other main units in the device, are denoted as follows: A is a clutching means which is shown as an electro-magnetically engaged frictional type clutch generally of the type which has recently been publicized as a product of the Bureau of Standards, that is, utilizes a mixture of iron filings or particles with graphite or other carrying substance as oil, and engagement is effected by electro-magnetic excitation of the iron particles and co-incident magnetic attraction of the armature plate; B is a clutching means which is also of the electro-magnetic type employing a mixture of iron filings and graphite or other substance but has not the aramature plate movable into closer engagement, that is it is of the fixed gap-type; C is a cltuching means which is also of the electric-magnetic type similar to the type of the B clutch means. These three clutching means A and B and C are generally of the type publicized by the Bureau of Standards, and this type is used in the device because of its simplicity and automatic engaging, although there may be utilized to perform the clutching functions any other types of clutch means, such as any frictional type clutches, or fluid clutches or magnetic clutches.

Referring now, especially to Figures 1 and 2, a more specific and detailed description of the units in the device and the elements of each unit, is now made as follows.

The reciprocating engine X has a crank case 1, engine cylinders 2, pistons 3, connecting rods 4, crank shaft 5 rotating in bearings 6, inlet ports 7 for air charging, exhaust ports 8 for gas exhaust discharging, fuel injection nozzles 9, one in each cylinder injecting fuel thereto, spark ignition plugs 10 which may be of any type and served with electric current for ignition by any means, not shown. The crank shaft at one end has fixed thereon a bevel gear 11 which is engaged with bevel gear 12 to drive the pump shaft 13 at the same speed as the speed of crank shaft 5, and this pump shaft 13 drives the main injection fuel pump 14 which draws liquid fuel or other fuel from supply conduit 15 and delivers the fuel through individual fuel conduits 16 to the several injection nozzles 9 and thereby to each engine cylinder combustion chamber 17. The pump shaft 13 also drives by its extension the auxiliary fuel pump 18 which draws fuel from supply conduit 19 and delivers the fuel by conduit 20 to the turbine auxiliary combustion chamber by nozzle 21. The pump 14 may be controlled manually as to its discharge of fuel to injection nozzles by a supply control valve 24, this being shown only diagrammatically as a means of control of the fuel delivery, any control means being usable with the device for varying the fuel supply. The fuel supply by pump 14 should be of such great maximum capacity that the fuel delivered to engine cylinder combustion chambers 17 for maximum power is considerably larger than the supply for the normal power output, when there is not the increased or double range air charge and output, as hereafter described.

The crank shaft 5 has also fixed on its end adjacent the bevel gear 11, a large spur gear 25 which drives a smaller spur gear 26 on shaft 27, the latter being rotatable in bearing fixture 28. A larger spur gear 29 on shaft 27 drives a small spur gear 30 which is fixed on a compressor drive shaft 31, the latter being rotatable in bearings 32. The compressor drive shaft 31 has fixed on it centrally of its length, a compressor rotor 33 of the centrifugal type having vanes 34, and the latter is always rotatable with compressor drive shaft 31 and draws atmospheric air from space 35 and discharges air under pressure to annular diffusion chamber 36 and therefrom to an air manifold 52 delivering the air under pressure to the inlet ports 7 of the engine X.

The compressor drive shaft 31 may also drive two other compressor rotors of the centrifugal type, the auxiliary compressor rotor 37 which is a part of the compressor unit Z2 and the auxiliary compressor rotor 38 which is a part of the compressor unit Z3. The compressor drive shaft 31 is not permanently engaged with these auxiliary rotors 37 and 38 but may be engaged thereto by the clutches B and C. The compressor rotors 37 and 38 are each of the centrifugal type. The compressor drive shaft 31 at normal average speeds of the engine X is operated at very high speeds, say from twenty to thirty thousand revolutions per minute. The compressor rotor 37 of unit Z2 normally is stationary, but may be engaged to compressor drive shaft 31 by the electro-magnetic clutch B and the latter has the coil 39 which is excited when current is passed to it or through it from the ring contacts 40 (two) on member 41 and the clutch B also has the armature drum 42 surrounding the coil member 39, there being an annular gap 43 which is filled with the mixture of iron filings (particles) and graphite or oil, so that when the coil member 39 is electro-magnetically excited, the iron filings serve to grip the one member of the clutch to the other. The armature drum member 42 is rotatively fixed to the centrifugal compressor rotor 37, so that the latter may be electro-magnetically engaged to the compressor drive shaft 31 for driving thereby.

The compressor rotor 38 of the compressor unit Z3 normally is stationary but may be engaged to the compressor drive shaft 31 by the electro-magnetic clutch C, and the latter has the electro-magnetic coil 44 which is excited when current is passed to it or through it from the pair of ring contacts 45 on member 46 and the clutch C also has the armature drum 47 surrounding the coil member 44, there being an annular gap 48 which is filled with the mixture of iron filings of particles and graphite or oil, so that when the coil member 44 is electromagnetically energized, the iron filings serve to grip the one member of the clutch to the other. The armature drum member 47 is rotatively fixed to the centrifugal compressor rotor 38, so that the latter may be electromagnetically engaged to the compressor drive shaft 31. The coil members 39 and 44 of the clutches B and C are each fixed rotatively to the compressor drive shaft 31.

The compressor unit Z2 has an annular diffusion chamber 49 surrounding the compressor rotor 37, formed in casing 50, and this diffusion chamber 49 delivers air under compression by way of conduit 51 to the air manifold 52 which is the manifold delivering from compressor unit Z1, and there is a flap valve 53, pivotably mounted by hinge 54, so that this flap valve 53 normally seats itself, automatically by gravity, but will automatically open when there is air pressure under it from the compressor unit Z2 to open it, whereupon air flows to air manifold 52 and joins the air passing therethrough from compressor unit Z1, so that air pressure will be increased by the delivery of a larger volume, the parts of the engine X, and the ports and conduits being proportioned, and the speed and size of the compressor rotors also being proportioned, so that this increase of pressure of air will occur when both rotors deliver air under pressure.

The compressor Z3 has an annular diffusion chamber 55 surrounding compressor rotor 38, formed in casing 56, and this diffusion chamber 55 delivers air under compression, somewhat less than that of the other compressors, to the turbine auxiliary combustion chamber 57 by way of conduit 58, a hand or manually controlled valve 59 being located in the conduit 58 so that this flow to auxiliary combustion chamber 57 may be obstructed, when the compressor rotor of unit Z3 is not operative. The valve 59 is turned to either position by means of the hand lever 60, but it is to be understood that any other means may be utilized for the control of this valve 59. The nozzle 21 may be caused to discharge fuel to auxiliary combustion chamber 57 whenever the fuel pump 18 is made to deliver fuel by manual opening of the supply fuel valve 61. The auxiliary combustion chamber 57 has located in it a spark plug 63 or other ignition means for effecting ignition, this spark means being supplied with current in any manner, not shown.

The turbine auxiliary combustion chamber 57 normally does not deliver any combustion gases or air or fuel to the annular turbine inlet chamber or nozzle chamber 64 but only in the extraordinary operation. In normal operation gases of combustion from the exhaust ports 8 of the reciprocating piston engine X flow through the exhaust manifolds 65 to the uniting conduit 66 and thereby into annular nozzle chamber 64, from whence the gases of combustion will flow as directed by the nozzle guide blades 67 in the manner usual with gas turbines, and the gases so directed will impinge upon the first stage of turbine blades 68, and will flow successively therefrom through the reaction or stator blades 69, between them, to the second stage of turbine rotor blades 70, flowing between them and thereby to the annular turbine exhaust chamber 71, from whence gases of combustion will flow to the common exhaust duct 72 to the two exhaust ducts 73, issuing thereby to atmosphere. The stages of blades 68 and 70 are fixed on the turbine rotor disk member 74 and the latter is fixed rotationally on the turbine shaft 75, which is mounted in the rotor bearings 76.

The turbine shaft 75 has fixed on it, outside of the turbine casing 77, a small spur gear 78, which is in engagement with large spur gear 79 on shaft 80 and the latter has small spur gear 81 fixed on it and engageable with the large spur gear 82 for forward drive, when spur gear 81 is moved axially by lever 83 into the position of engagement therewith. The spur gear 81 may be moved from that engagement into a neutral position or for reverse driving into engagement with a reverse idler 84 which is in engagement with large spur gear 85 for reverse driving. It will be seen that the large spur gear 82 is in engagement with the driven propeller shaft 86 through a one way roller-clutch 87 for the forward drive to driven shaft 86, but that the reverse drive spur gear 85 is in permanent engagement with the driven propeller shaft 86. By reference to Figure 3 it will be observed that the driven shaft 86 drives a bevel gear 88 which is engaged with larger bevel gear 89 and the latter is on differential casing 90 (dotted lines only) and drives, in the customary manner by differential gears (not shown), the wheel shafts 91, which have universal joints 92 interposed and drive the road wheels 93.

The end of the engine crankshaft 5 opposite to that on which the fuel pump and compressor driving gears are placed, has fixed on it the drum member 94 of the electromagnetic clutch A, and this drum member 94 will also act as a flywheel for the crankshaft 5 and has fixed on it externally the ring gear 95 which may be used for starting of the crankshaft 5 in the manner customary with automotive engines. The drum member 94 has fixed in it the electromagnetic coil 96 and has also rotatively fixed with it by internal teeth 97 the armature member 98 which has grooved association with teeth 97 so that armature member 98 may slide axially to or away from electromagnetic coil 96 and engage between these members 98 and 94 the driven plate member 99 which is rotatively fixed by internally grooved sleeve 100 on toothed member 101 formed on driven shaft (propeller shaft) 86 at the latter's adjacent end. The space between and around the armature member 98 (an annular member) and plate 99 and internally of drum member 94 is filled with a mixture of iron filings or particles and graphite or oil so that this mixture will act in the manner of electromagnetically energized iron filings to grip the armature and plate members and drum member into engagement, the armature member 98 sliding toward the face of the coil mounting member of the drum member.

The shaft 84ᵃ which is always in operation and driven at a speed which is proportionate with the speed of the driven propeller shaft 86 has an extension shaft 102 which carries revolvably the pivotably mounted governor fly-arms 103 which may at a predetermined (or adjusted) speed thrust the attached arms 104 against the disk portion 105 of a contact lever 106. The latter is pivotably mounted at 107 on a fixture 108 and when thrust at the higher speed will move into contact with two contacts 109 whereby a circuit is completed, at the high speed, with a battery 110 and an electromagnet 111, whereby there is attracted, at the high speed, the armature 112 and this attraction movement of armature 112 moves the latter from contact with contact 113 and into contact with contact 114, so that the alternative circuit as hereafter described for the high speed, is thus made, and the circuit for the low speed is broken.

Two spring contacts 115 held by any fixture serve to complete a circuit as hereafter described with the ring contacts 40 of clutch B. Two spring contacts 116 held by any fixture serve to complete a circuit as hereafter described with the ring contacts 45, and two spring contacts 117 held by any fixture serve to complete a circuit as hereafter described with ring contacts 118. A battery 119 provides a current circuit with each of the coils 96, 39, 44, and this circuit is generally broken or completed by a hand switch 120 for effecting inactivation of all the coils. A hand switch 121 enables the driver to close the circuit through coil 44 of the clutch C, at any time for extra power by air passed to combustion chamber 57 directly from blower or compressor 38 when extra power is desired. A hand switch 122 enables the driver to close a circuit through the coil 39 of clutch B at any time when the driver desires additional air under compression to be delivered to the cylinders of engine X, for maximum power, even when the car speed exceeds the critical speed as determined by governor 103. This is to provide extraordinary power even though the clutch A is engaged.

Having described in detail the elements or units of the invention, the operation is now described. It should first be observed that the engine X should be so constructed, of such strength, and the combustion spaces 17 of the engine cylinders, should be of such capacity that the unusual strains of extraordinary compression, will be contained, so that the engine X may adequately use the surplus quantity of air provided by the auxiliary compressor Z2.

For normal operations, the hand valve 59 is closed and auxiliary compressor Z3 is not effective since clutch C is deenergized. The engine X will be started in operation by any starting means applied to ring gear 95 in such starting hand switch 120 is open, so the clutches are all disengaged. To start the load on driven shaft 86, that is to start the automobile or vehicle, the operator, after increasing fuel supply to nozzles 9 by further opening of valve 24, and on closing the hand switch 120, current flows by way of contact 113 and armature lever 112 through coil 39 of clutch B, and this current flow engages clutch B so that compressor rotor 37 is now engaged to compressor drive shaft 31 and an additional proportionate quantity of air under compression is delivered to manifold 52 and thereby to inlet ports 7 scavenging and charging the cylinders 2 in their compression spaces 17 with a proportionately large quantity of air under compression which may be as high as say fifty to eighty pounds per square inch. The operator at the same time increases the fuel supply by valve 24, so that the extraordinary air supply may be utilized for combustion. The governor 103–104, at starting, has not closed contacts 109, so clutch A is then disengaged. The engine X now consumes a relatively large quantity of air under high compression, and at exhaust periods in engine X, the gases of combustion are discharged by exhaust ports 8 to exhaust conduits 65, to conduit 66, to annular inlet chamber 64, and the exhaust gases thereby are directed against the turbine blades 68, and successively against turbine blades 70 to provide large driving torque by turbine rotor shaft 75, and through gears 78, 79, 81, 82, to driven propeller shaft 86, which is now effective on driving wheels 93. This drive by gas turbine rotor 74 to driven shaft 86 will proceed until the automobile speed reaches the critical speed which may be say fifteen to twenty miles per hour. This critical speed may be subject to adjustment by any means such as is commonly provided with governor means.

When the critical speed is reached, as governed by governor 103, the arms 104 will contact disk 105 of lever 106 and the latter will contact contacts 109 completing the circuit through electro-magnet 111, whereupon the armature lever 112 will be attracted and break contact with contact 113 and at the same time making contact with contact 114, so that coil 39 of clutch B will now be deenergized and coil 96 of main clutch A will be energized, so that thereby engine shaft 5 will be engaged frictionally and electro-magnetically with the driven propellor shaft 86, directly by clutch A, and at this engagement shaft 86 is brought to the speed of crank shaft 5, and if turbine rotor 74 is not rotating at sufficient speed, roller clutch (a one-way clutch) will disengage and the shaft 86 will be freed of the turbine rotor 74. However this engagement will continue, as long as the exhaust gases drive the turbine rotor 74 at a fast enough speed. At any time, to secure additional driving power, the operator may by hand switch 121 engage clutch C, and thereby compressor rotor 38 is engaged and a quantity of air under pressure, proportioned to speed, is delivered by compressor Z3 directly to combustion chamber 57 of the turbine Y so that additional driving gases at high heat may be delivered to the turbine Y and additional power generated to drive shaft 86. The operator may by hand switch 122 engage clutch B and thereby compressor rotor 37, to provide additional power, whatever the car speed.

It should be observed that the normal driving load should be such, that the normal air supply by the fixed drive compressor rotor 33 of compressor Z1, and fuel supply proportioned to this air supply, will be sufficient power for this normal driving load. When the driving load exceeds the normal, as at starting, hill climbing and heavy pulling, the operator may have the additional driving power provided by compressor Z2, and also compressor Z3, if desired. Compression space in the engine cylinders combustion spaces 17 may be such as to procure approximately two hundred pounds pressure, more or less, at maximum compression, before combustion, when only normal air supply is effected, but compression before combustion may reach say four to six hundred pounds, or even more, when the additional air supply by compressor Z2 is effective, for additional loads or torque. The compressors and the ports charging the engine cylinders 2, and the air passages through gas turbine Y, are all so proportioned, that, when the main clutch A is not in engagement, and engine crank shaft 5 operates at high speed, the gas flow to turbine Y will be at a relatively considerable pressure and that this pressure may be made a maximum, when clutch A is disengaged, by the additional air supplied by compressor Z2 and the additional fuel supply, as provided, and that under such driving conditions, the gas flow to turbine inlet chamber 64 may be at a pressure as high as say sixty pounds per square inch, or even as much as eighty to a hundred pounds, depending on the proportions of the elements. Thus a large quantity of driving gases at relatively high pressure are provided for driving turbine shaft 75 and shaft 86, when clutch A is disengaged. This driving power may be further increased, under some conditions, by engaging clutch C and compressor Z3, so that additional air may be combusted with additional fuel in auxiliary combustion chamber 57, this auxiliary combustion being ordinarily not effected, except as desired by the operator, by closing of hand switch 121 and opening of fuel valve 61. It is contemplated that the gas flow from the engine cylinders 2, when clutch A is disengaged, will normally be sufficient for the driving of shaft 86 by turbine Y, and that the turbine should be proportioned so as to best effect this driving. For normal driving conditions, above the critical speed, the output of the engine X should be proportioned to be sufficient, clutch A being then engaged, turbine Y supplying additional drive only as it may.

By engaging gear 81 with gear 84 reverse driving of shaft 86 may be effected, for reverse drive of the automobile or even for braking effect if the car speed is not above the critical speed, and even above critical speed if hand switch 120 is opened.

A hand switch 123 is provided in the circuit of clutch A (coil 96) so that this hand switch may be opened by the operator to disengage the clutch A, even under speeds above the critical speed determined by governor 103, but this hand switch 123 is normally closed, until such time as the operator may determine that driving conditions are such that main clutch A should be disengaged. By this disengagement the operator may, if he also closes switch 122 cause the crank shaft 5 to be operated at maximum speed and also cause compressor Z2 to deliver the additional air under compression to engine cylinders 2, for maximum power delivery.

The fuel pump 14 is shown merely as a diagrammatic representation of a fuel pump supply driven at speed proportionate to speed of crank shaft 5, and this pump 14 is contemplated to deliver as controlled by hand valve 24, the quantity of fuel desired for either of the conditions of operation, but it should be understood that this fuel supply may be pumped and delivered to the engine cylinders 2 in any way as by a carburetor supply or by several pumps as may be desired for best control to secure the best power and efficiency, fuel supply means being commonly known of many kinds, and the separation of the fuel supply into such proportions under controls, as may be necessary, being a factor of design of the fuel pump means and its control.

While I have shown particular devices and combinations of devices, in the illustration of my invention, I contemplate that other devices and combinations of devices may be utilized in the design of my invention, without departing from the spirit and contemplation thereof. The engine X including the cylinders 2, pistons 3, connecting rods 4, crank shaft 5 is for distinction from the turbine members, called a primary engine. The annular space interiorly of the turbine casing 77, including the space wherein are rotor and stator guides and inlet nozzles and the inlet thereto is for distinction called a turbine gas course or turbine gas flow course.

What I claim is:

1. A power and drive means comprising in combination: a primary engine having cylinders and reciprocable pistons therein and a rotatable engine crank shaft and connecting means between the reciprocable pistons and the rotatable engine crank shaft; a means having driven connection with and operated at a proportionate speed by the said engine crank shaft to charge the cylinders of the primary engine with air and fuel for combustion in power strokes of the pistons in cyclic order and an exhaust chamber and ports discharging from the engine cylinders to the exhaust chamber; a work driving shaft mounted for rotation and for utilization by interconnection with any work performing means; a turbine casing having therein a turbine chamber and a turbine rotor mounted for rotation in the turbine chamber; a driving connection between the turbine rotor and the work driving shaft; a discharge passage from said exhaust chamber to the turbine chamber for passage of gases of combustion to drive the turbine rotor; a clutching means interposed between the rotatable engine crank shaft of the primary engine and the work driving shaft for engagement in one phase of operation in which there is driving torque transmission from the said rotatable engine crank shaft to the said work driving shaft and for disengagement in an alternative phase of operation in which there is release of the rotatable engine crank shaft of the primary engine to permit driving of the work driving shaft by the turbine rotor without driving of the work driving shaft by mechanical interconnection of the work driving shaft with the rotatable engine crank shaft.

2. A power and drive means comprising in combination: a primary engine having cylinders and reciprocable pistons therein and rotatable engine crank shaft and connecting means between the reciprocable pistons and the rotatable engine crank shaft; a means having driven connection with and operated at a proportionate speed by the said engine crank shaft to charge the cylinders of the primary engine with air and fuel for combustion in power strokes of the pistons in cyclic order and an exhaust chamber and ports discharging from the engine cylinders to the exhaust chamber; a work driving shaft mounted for rotation and for utilization by interconnecton with any work performing means; a turbine casing having therein a turbine chamber and a turbine rotor mounted for rotation in the turbine chamber; a disconnectable driving connection between the turbine rotor and the work driving shaft; a discharge passage from said exhaust chamber to the turbine chamber for passage of gases of combustion to drive the turbine rotor; a clutching means interposed between the rotatable engine crank shaft of the primary engine and the work driving shaft for engagement in one phase of operation in which there is driving torque transmission from the said rotatable engine crank shaft to the said work driving shaft and for disengagement in an alternative phase of operation in which there is release of the said rotatable engine crank shaft of the primary engine to permit driving of the work driving shaft by the turbine rotor without driving of the work driving shaft by mechanical interconnection of the work driving shaft with the rotatable engine crank shaft.

3. A power and drive means comprising in combination: a primary engine having cylinders and reciprocable pistons therein and a rotatable engine crank shaft and connecting means between the reciprocable pistons and the rotatable engine crank shaft; a means having driving connection with and operable at a proportionate speed by the said engine crank shaft to charge the cylinders of the primary engine with air and fuel for combustion in power strokes of the pistons in cyclic order and an exhaust chamber and ports discharging from the engine cylinders to the exhaust chamber; a work driving shaft mounted for rotation and for utilization by interconnection with any work performing means; a turbine casing having therein a turbine chamber and a turbine rotor mounted for rotation in the turbine chamber; a driving connection between the turbine rotor and the work driving shaft with a one-way clutch interposed in the drive to free the work drivin gshaft from the turbine rotor when torque of the turbine rotor does not transmit drive to the work driving shaft; a discharge passage from said exhaust chamber to the turbine chamber for passage of gases of combustion to drive the turbine rotor; a clutching means interposed between the rotatable engine crank shaft of the primary engine and the work driving shaft for engagement in one phase of operation in which there is driving torque transmission from the said rotatable engine crank shaft to the said work driving shaft and for disengagement in an alternative phase of operation in which there is release of the rotatable engine crank shaft of the primary engine to permit driving of the work driving shaft by the turbine rotor without driving of the work driving shaft by mechanical interconnection of the work driving shaft with the rotatable engine crank shaft.

4. A power and drive means comprising in combination: a primary engine having cylinders and reciprocable pistons therein and a rotatable engine crank shaft and connecting means between the reciprocable pistons and the rotatable engine crank shaft; a means having driving connection with and operable at a proportionate speed by the said engine crank shaft to charge the cylinders in cyclic order with air and fuel for combustion in power strokes of the pistons and an exhaust chamber and ports discharging from the cylinders to the exhaust chamber; a work driving shaft mounted for rotation and for utilization by interconnection with any work performing means; a turbine casing having therein a turbine chamber and a turbine rotor rotatably mounted therein for rotation; a driving gear train including a one-way clutch between the turbine rotor and the work driving shaft for transmission of driving torque from the turbine rotor to the work driving shaft; a discharge passage from said exhaust chamber to the said turbine chamber for passage of gases of combustion to drive the turbine rotor; a clutching means interposed between the said rotatable engine crank shaft of the primary engine and the said work driving shaft for engagement in one phase of operation in which there is driving torque transmission from the said rotatable engine crank shaft to the said work driving shaft and for disengagement in an alternative phase of operation in which there is release of the rotatable engine crank shaft of the primary engine to permit driving of the work driving shaft by the turbine rotor without driving of the work driving shaft by mechanical interconnection of the work driving shaft with the rotatable engine crank shaft.

5. A power and drive means comprising in combination: a primary engine having cylinders and reciprocable pistons therein and a rotatable engine crank shaft and connecting means between the reciprocable pistons and the rotatable engine crank shaft and having intake port means for introduction of air and fuel for charging and having discharge port means to discharge products of combustion; an air compressing means receiving air from atmosphere and being in driven connection with the rotatable engine crank shaft to be driven thereby at speeds proportionate with the speed of said engine crank shaft; a means passing air compressed by the air compressing means to the cylinders through the intake port means and means in connection to supply fuel for combustion; a gas exhaust chamber to which said discharge port means discharges; a turbine casing having a turbine chamber and a turbine rotor rotatably mounted for rotation in the turbine chamber; the said gas exhaust chamber having discharging connection to said turbine chamber of the turbine casing; a discharge passage from said turbine chamber; a work driving shaft mounted for rotation and for utilization by interconnection of the work driving shaft with any work performing means; a driving connection between said turbine rotor and the work driving shaft; a clutching means in driving connection between the rotatable engine crank shaft and the work driving shaft for engagement in one phase of operation in which there is driving torque transmission to the work driving shaft from the rotatable engine crank shaft and for disengagement in an alternative phase of operation in which there is release of the rotatable engine crank shaft of the primary engine to permit driving of the work driving shaft by the turbine rotor without driving of the work driving shaft by mechanical interconnection of the work driving shaft with the rotatable engine crank shaft.

6. All of the means as described and as claimed in claim 5 and in combination therewith, a one-way clutching means in the driving connection between the turbine rotor and the work driving shaft.

7. All of the means as described and as claimed in claim 5 and in combination therewith, a second air compressing means receiving air from atmosphere and having means to discharge air as compressed to the cylinders of the primary engine and having clutching means for engagement and disengagement of the said second air compressing means from driving connection with the rotatable engine crank shaft of the primary engine.

8. All of the means as described and as claimed in claim 5 and in combination therewith, a second air compressing means receiving air from atmosphere and having means to discharge air as compressed to the cylinders of the primary engine and having driving connection with the rotatable engine crank shaft of the primary engine, the last named driving connection including clutching means for engagement or disengagement of this driving connection, and in combination therewith a third air compressing means receiving air from atmosphere and having means to discharge air as compressed to the said turbine chamber and having means to discharge fuel to said air discharged from the last named compressing means for combustion therewith, the said last named air compressing means having driving connection with the rotatable engine crank shaft of the primary engine, the last named driving connection including clutching means for engagement or disengagement of this driving connection.

9. All of the means as described and as claimed in claim 5 and in combination therewith, a speed governing means having governing action proportioned to the speed of the work driving shaft and means inter-acting between the speed governing means and the clutching means between the rotatable engine crank shaft and the work driving shaft to disengage said clutching means when the speed of the work driving shaft is below a critical speed and to engage the said clutching means when speed of the work driving shaft is over the said critical speed.

10. All of the means as described and as claimed in claim 5 and in combination therewith, and definition thereof, the said clutching means between the rotatable engine crank shaft and the work driving shaft being electromagnetically engaging clutch means, and in combination therewith, speed governing means having governing action proportioned to speed of the work driving shaft and means inter-acting between the speed governing means and the said electro-magnetically engaging clutch means to pass electric current therethrough for engaging said clutching means when speed of the work driving shaft is over a critical speed and to disrupt the passage of said electric current through said electro-magnetically engaging clutch means when speed of the work driving shaft is less than the critical speed.

11. All of the means as described and as claimed in claim 5 and in combination therewith: a second air compressing means receiving air from atmosphere and having means to discharge air as compressed to the combustion space of the primary engine and having driving connection with the rotatable power shaft of the primary engine, the last named driving connection including clutching means for engagement or disengagement of this driving connection; the said clutching means between the rotatable engine crank shaft and the work driving shaft being electro-magnetically engaging clutch means; and the said clutching means between said second air compressing means and the rotatable engine crank shaft being electro-magnetically engaging clutch means; and speed governing means having governing action proportioned to the speed of the work driving shaft and means interacting between the speed governing means and both electro-magnetically engaging clutch means to engage said first mentioned clutching means and disengage said second mentioned clutching means when speed of the driven shaft is over a critical speed and to disengage said first mentioned clutching means and engage said second mentioned clutching means when speed of the driven shaft is less than the critical speed.

12. All of the means described and as claimed in claim 5 and in combination therewith; a second air compressing means receiving air from atmosphere and having means to discharge air as compressed to the combustion space of the primary engine, the said second air compressing means having driving connection including electro-magnetically engaging clutch means between the said second air compressing means and the rotatable engine crank shaft of the primary engine; and in combination a third air compressing means receiving air from atmosphere and having means to discharge air as compressed to said turbine chamber and including means to discharge fuel therewith for combustion, the said third air compressing means having driving connection with the rotatable engine crank shaft including electro-magnetically engaging clutch means; and speed governing means with governing action proportioned to the speed of the work driving shaft and means interacting between the speed governing means and each of the said clutching means, to engage the first named clutching means and disengage the second named clutching means when speed of the work driving shaft is over a critical speed and to disengage the first named clutching means and engage the second named clutching means when speed of the work driving shaft is less than the critical speed; and means to engage said third named clutching means or disengage said third clutching means.

13. All of the means as described and as claimed in claim 5 and in combination therewith, a speed governing means having governing action proportionate to the speed of the work driving shaft; an electro-magnetically actuated means including an electric circuit to be effective for the engagement or disengagement of the clutching means between the rotatable engine crank shaft and the work driving shaft; and an electo-magnetic switch in said circuit; and means actuated by the said speed governing means to close said switch.

14. All of the means as described and as claimed in claim 5 and in combination therewith; an auxiliary air compressing means receiving air from atmosphere and having means to discharge air as compressed to said turbine chamber and including means to discharge fuel therewith to said turbine chamber for combustion with the air; the last named auxiliary air compressing means having associated therewith a clutching means and driving means including this clutching means between the auxiliary compressing means and the rotatable engine crank shaft to permit engagement of the auxiliary air compressing means for driving by the rotatable engine crank shaft or to permit release of the auxiliary air compressing means from driving connection with the rotatable engine crank shaft.

15. All of the means as described and as claimed in claim 5 and in combination therewith; an auxiliary air compressing means receiving air from atmosphere and having means to discharge air as compressed to said turbine chamber; the auxiliary air compressing means having associated therewith a clutching means and driving means including this clutching means between the auxiliary air compressing means and the rotatable engine crank shaft to permit engagement of the auxiliary air compressing means for driving by the rotatable engine crank shaft or to permit release of the auxiliary air compressing means from driving connection with the rotatable engine crank shaft; and auxiliary fuel supply means operated by the said rotatable engine crank shaft and means in association therewith to effect operation of the said fuel supply means for delivery of fuel for combustion with air as delivered by said auxiliary air compressing means to the turbine chamber or to effect discontinuance of delivery of fuel thereby.

16. A power and drive means comprising in combination: a primary engine having cylinders and reciprocable pistons therein and a rotatable engine crank shaft and connecting means between the reciprocable pistons and the rotatable engine crank shaft; a means to charge the cylinders in cyclic order with air and fuel for combustion in power strokes of the pistons and an exhaust chamber and ports discharging from the cylinders to the exhaust chamber; a work driving shaft mounted for rotation and for utilization by interconnection with any work performing means; a turbine casing having a turbine chamber therein and having a turbine rotor mounted for rotation therein; a driving gear train between the turbine rotor and the work driving shaft for transmission of driving torque from the turbine rotor to the work driving shaft; a discharge passage from the said exhaust chamber to the turbine chamber for passage of gases of combustion from the primary engine to the said turbine chamber to drive the turbine rotor; a clutching means interposed between the said rotatable engine crank shaft of the primary engine and the said work driving shaft for engagement in one phase of operation in which there is driving torque transmission from the said rotatable engine crank shaft to the said work driving shaft and for disengagement in an alternative phase of operation in which there is release of the rotatable engine crank shaft of the primary engine to permit driving of the work driving shaft by the turbine rotor without driving of the work driving shaft by mechanical interconnection of the work driving shaft with the rotatable engine crank shaft and so that in said alternative phase of operation the said rotatable engine crank shaft is free to rotate at a speed independent of the speed of the work driving shaft to provide proportionately largely increased flow of exhaust gases from the primary engine to the said turbine chamber.

17. The means as specified in claim 16 and in combination therewith: an auxiliary air compressing means receiving air from atmosphere and having means to discharge air as compressed to said turbine chamber and including means to discharge fuel therewith to said turbine chamber for combustion with the air; the last named auxiliary air compressing means having associated therewith a clutching means and driving means including this clutching means between the auxiliary air compressing means and the rotatable engine crank shaft to permit engagement of the auxiliary air compressing means for driving by the rotatable engine crank shaft or to permit release of the auxiliary air compressing means from driving connection with the rotatable engine crank shaft.

(References on following page)

References Cited in the file of this patent

UNITED STATES PATENTS

| | | |
|---|---|---|
| 2,065,955 | Waseige | Dec. 29, 1936 |
| 2,142,596 | Algarsson | Jan. 3, 1939 |
| 2,238,889 | Kollmann | Apr. 22, 1941 |
| 2,375,006 | Larrecq | May 1, 1945 |
| 2,397,941 | Birkigt | Apr. 19, 1946 |
| 2,547,660 | Prince | Apr. 3, 1951 |
| 2,567,581 | Salter | Sept. 11, 1951 |
| 2,585,968 | Schneider | Feb. 19, 1952 |
| 2,608,051 | Nettel | Aug. 26, 1952 |
| 2,639,414 | Gould | May 19, 1953 |

FOREIGN PATENTS

| | | |
|---|---|---|
| 346,108 | Great Britain | Apr. 9, 1931 |
| 537,483 | Great Britain | June 24, 1941 |
| 677,726 | Great Britain | Aug. 20, 1952 |
| 984,127 | France | Feb. 21, 1951 |